United States Patent [19]

Falk

[11] 4,094,388
[45] June 13, 1978

[54] AUTOMATIC BRAKE ADJUSTING MEANS

[75] Inventor: Edward J. Falk, St. Louis County, Mo.

[73] Assignee: Wagner Electric Corporation, Parsippany, N.J.

[21] Appl. No.: 776,846

[22] Filed: Mar. 14, 1977

Related U.S. Application Data

[62] Division of Ser. No. 703,933, Jul. 9, 1976, abandoned.

[51] Int. Cl.$^2$ .................................................. F16D 65/56
[52] U.S. Cl. ................................... 188/71.9; 188/72.7; 188/196 BA; 192/70.24; 192/70.25; 192/111 A
[58] Field of Search ................. 188/71.9, 72.7, 72.9, 188/196 BA; 192/70.23, 70.24, 70.25, 111 A

[56] References Cited

U.S. PATENT DOCUMENTS

| | | | |
|---|---|---|---|
| 3,155,195 | 11/1964 | Brawerman | 188/71.9 |
| 3,269,490 | 8/1966 | Swift | 188/196 BA X |
| 3,322,235 | 5/1967 | Forbush | 188/71.9 |
| 3,372,775 | 3/1968 | Beller et al. | 188/71.9 |
| 3,386,534 | 6/1968 | Press | 188/196 BA X |
| 3,460,653 | 8/1969 | Wieger | 188/196 BA X |
| 3,490,562 | 1/1970 | Press | 188/71.9 |
| 3,789,959 | 2/1974 | Kawaguchi | 188/71.9 |
| 3,993,170 | 11/1976 | Lessard | 188/71.9 |

FOREIGN PATENT DOCUMENTS

| | | | |
|---|---|---|---|
| 1,487,560 | 5/1967 | France | 188/71.9 |
| 1,232,259 | 5/1971 | United Kingdom | 188/71.9 |

*Primary Examiner*—George E. A. Halvosa
*Attorney, Agent, or Firm*—Eyre, Mann, Lucas & Just

[57] ABSTRACT

An air-actuated disc brake develops the required force magnification to operate disc brakes from an air pressure chamber using push-pull rods driving a pair of cam levers applying normal force to one shoe plate of the disc brake. Clamp action is carried through to an opposing brake shoe plate by a caliper. The entire air applied disc brake is mounted as a unit to the axle flange. An automatic adjuster compensates for brake lining wear.

7 Claims, 14 Drawing Figures

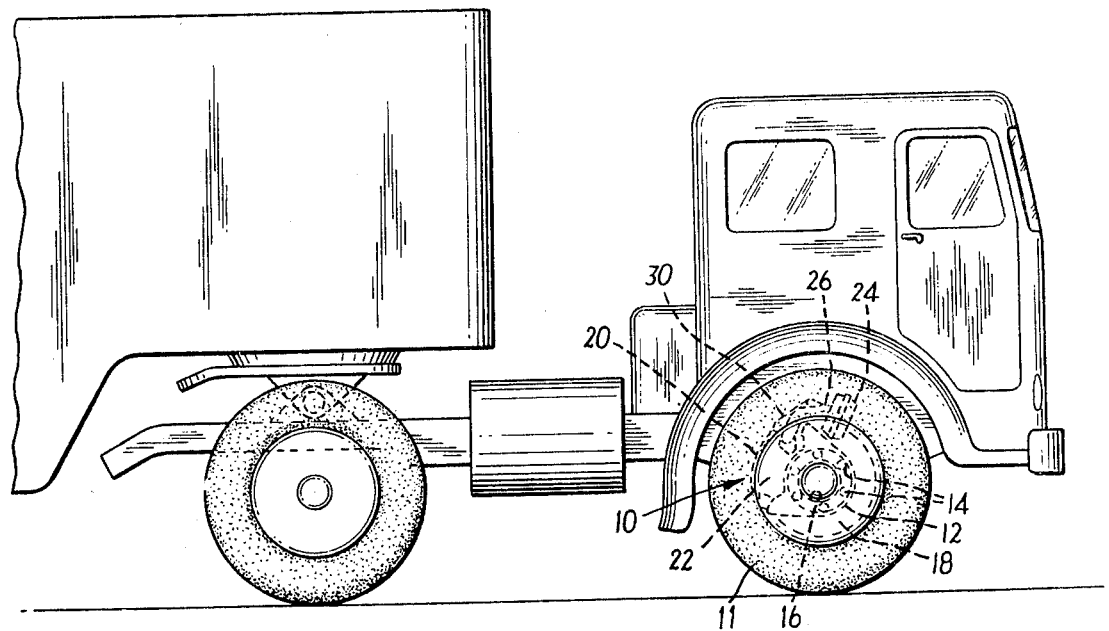
FIG. 1
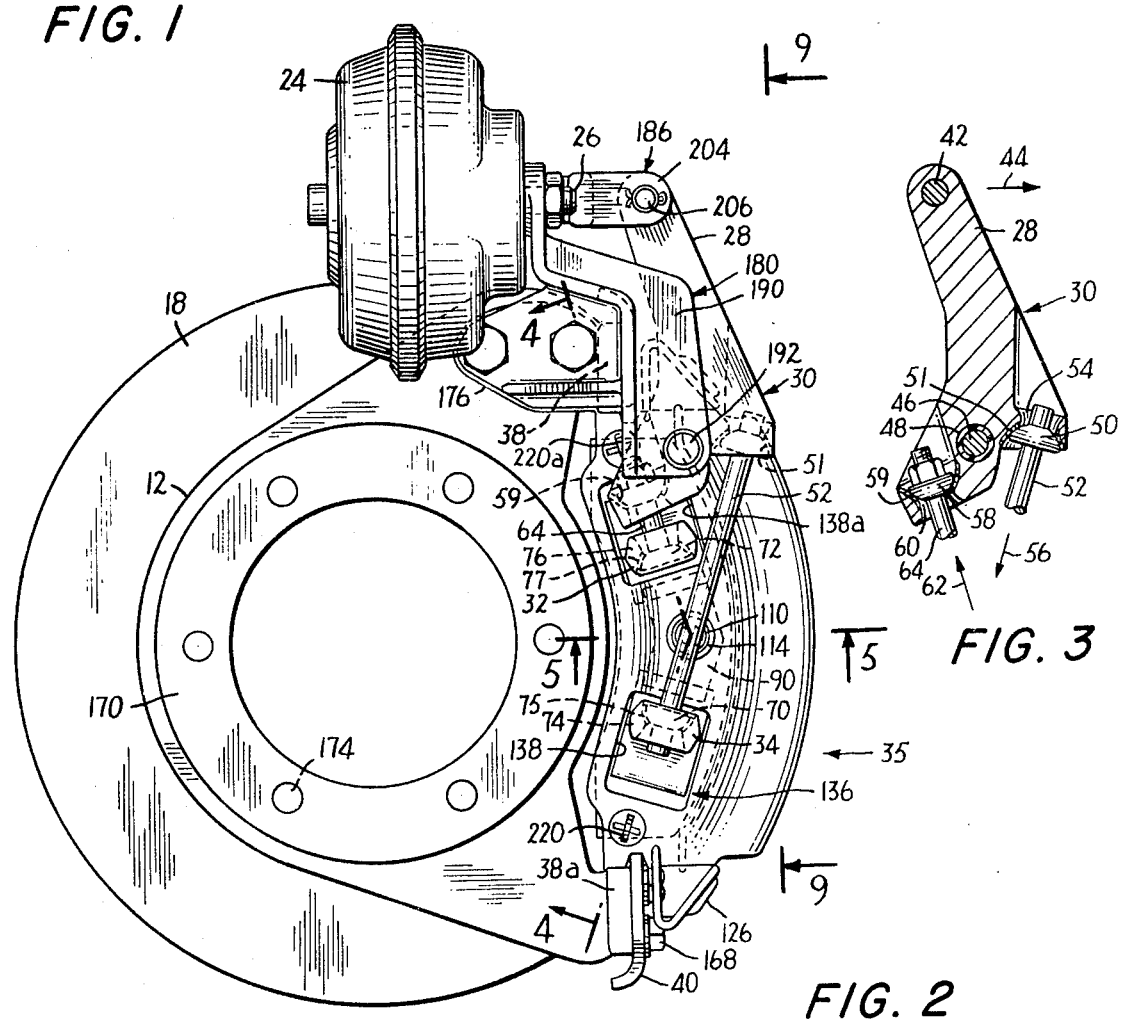
FIG. 3
FIG. 2

AUTOMATIC BRAKE ADJUSTING MEANS

This is a division, of application Ser. No. 703,933, filed July 9, 1976 now abandoned in favor of continuing application Ser. No. 823,506.

BACKGROUND OF THE INVENTION

Air brakes have been almost universally accepted for use in articulated vehicles of the tractor and semi-trailer type. This acceptance has come about because articulated vehicles require means on the tractor which can be used for applying and controlling the semi-trailer brakes. Because of technological advantages such as flexible hoses and quick-connect and disconnect air hose couplers, high pressure air has become virtually the only accepted transmission medium for this purpose.

Air brakes of the drum and shoe type have been satisfactorily used on commercial highway and off-road vehicles for many years. The arcuate shoes of drum type brakes tend to wrap into the brake drums in a stop in the forward direction. This wrapping action causes magnification of the braking force called energization. Brake torque imbalance between the two front wheels, caused by variation in the brake lining friction, is magnified by this energization. Brake torque imbalance could cause steering pulls.

The modern trend to higher stopping rates for trucks, coupled with the requirement for straight-line stopping, now threatens to exceed the ability of the drum brake. Disc brakes, both hydraulically operated and vacuum-assisted hydraulically operated, being non-energizing, have found increasing use in passenger automotive applications where higher braking performance, better straight-line stopping ability and reduction in brake fading was desired. U.S. Pat. Nos. 3,536,166, 3,768,604 and 3,835,962 in the name of E. J. Falk teach hydraulically operated disc brakes suitable for automotive applications. Similar use of disc brakes has not been made on articulated highway vehicles.

Until the present invention, practical brake components have limited the use of truck tractor disc brakes to actuation with air-applied hydraulic actuators. This limitation resulted from the need for force multiplication from the approximately 100 psig commonly available from the truck air supply to the approximately 45,000 pounds of normal force at the disc brake caliper in a large truck. Although the equivalent of such force multiplication was readily obtained using hydraulic cylinders, the hybrid air/hydraulic disc brake was complex and costly because it required both hydraulic and air actuators.

SUMMARY OF THE INVENTION

The instant invention teaches a simple rugged disc brake system in which a minimum number of mechanical elements provide force multiplication between a force-generating device and a pair of disc brake friction members. The force-generating device can be mechanical linkage or a hydraulic piston but best results are obtained with air actuation. Air actuation on the tractor of an articulated vehicle allows the use of the same control air pressure source for both tractor and trailer.

Friction variability in the mechanical path is reduced through permanently lubricated bearings at all rotating friction pivots. Such permanently lubricated bearings reduce friction differences since there is no lubricant depletion with use.

As S-type cam lever, actuated by an air brake chamber, applies equal and opposite forces to the ends of a pair of push-pull rods. The push-pull rods, in turn, apply force to a pair of cam levers. The cams connected to the cam levers apply normal force to one brake lining, or friction member, of a disc brake. Clamping force is carried through to an opposing brake lining through a brake caliper.

An automatic brake adjuster mechanism is included in one embodiment of the invention.

BRIEF DESCRIPTION OF THE DRAWINGS

FIG. 1 shows one embodiment of the air-operated disc brake mounted in its operating position at the front wheel of a highway vehicle.

FIG. 2 shows a view of the invention looking outward from the center of the vehicle.

FIG. 3 shows a longitudinal cross section of the S-type cam.

DETAILED DESCRIPTION OF THE PREFERRED EMBODIMENT

Figure 4:
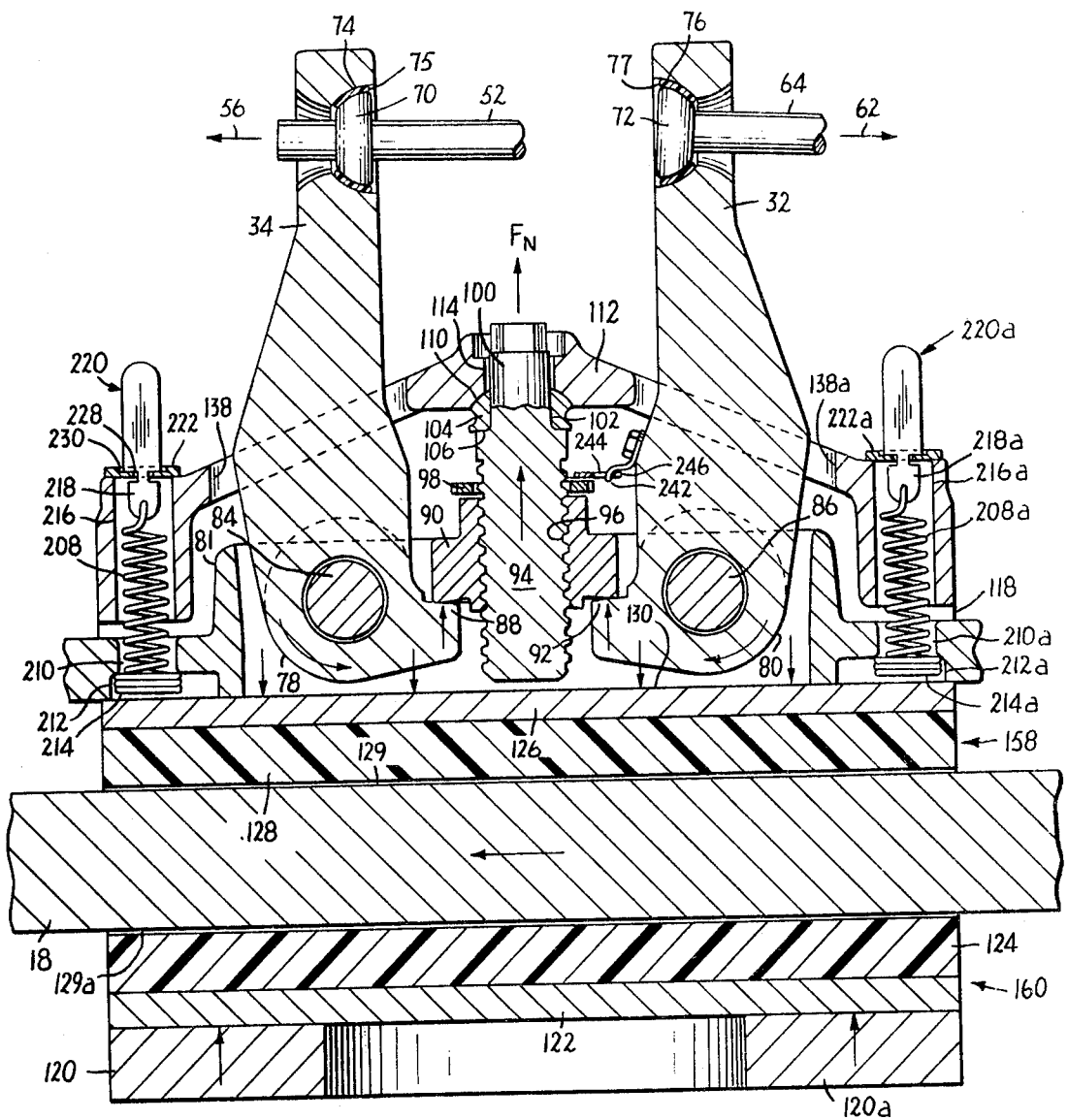
FIG. 4 shows a cross-sectional view of the disc brake taken along 4—4 in FIG. 2.

The air-applied disc brake system is shown generally at 10 in FIG. 1 in its operative location at a front wheel 11 of a vehicle. The disc brake system 10 is rigidly and non-rotatably attached to an axle flange (not shown) by a torque plate 12 using, for example, a plurality of bolts 14. A circular opening 16 in the center of the torque plate 12 provides clearance for the passage therethrough of the vehicle axis (not shown). A brake disc 18 is rotatably mounted inside and coaxial to the wheel 11 and is rigidly fixed to rotate therewith. Retarding forces applied to the brake disc 18 and transmitted to the vehicle wheel 11 are reacted against by the torque plate 12 and provide stopping torque which acts conventionally against the road surface to retard the vehicle.

A disc brake caliper 20 encloses a chordal portion 22 of the brake disc 18. A pair of arc-shaped brake shoes, one located on the inboard side of the brake disc 18, the other located on the outboard side of the brake disc 18, to be shown and described later, are held in relationship with portion 22 within the disc brake caliper 20. In the brakes-off condition, the brake shoes apply virtually no frictional force against the brake disc 18.

An air-brake chamber 24 is rigidly bracketed to the torque plate 12. Upon brake application, air pressure is admitted to the air-brake chamber 24. A chamber push rod 26 is forced outward by the air pressure within the air-brake chamber 24. The chamber push rod 26 applies force to a system of levers and cams which force the brake shoes into frictional contact with the inboard and outboard sides of the enclosed portion 22 of the brake disc 18. The frictional forces generated by the brake shoes are transmitted through the caliper 20 and the torque plate 12 directly into the axle flange of the vehicle.

Referring now to FIG. 2, a chamber push rod 26 is connected to the lever arm 28 of an S-type cam 30. The S-type cam 30 applies equal and opposite forces to a pull-lever 32 and a push-lever 34. The pull-lever 32 and push-lever 34 transmit their input forces to disc brake friction members located within the brake caliper assembly shown generally at 35.

The brake caliper assembly 35 develops frictional forces on the outer opposed parallel surfaces of the brake disc 18. The torque plate 12 is shown in its operative relationship with the brake disc 18. The torque plate 12 contains flange 38 and 38a to which are rigidly mounted a brake support plate 40 and the air-brake chamber 24.

FIG. 3 shows the S-type cam 30 and its actuating lever arm 28 in isolated cross section for clarity. The chamber push-rod force acts on the lever arm 28 through the pivot 42 in the direction 44. This force tends to cause the S-type cam 30 to rotate clockwise about its pivot 46. A permanently lubricated type sleeve 48 encircles the pivot 46 and provides a reduced-friction bearing surface for the S-type cam 30.

A hemispheric collar 50 on an actuating push rod 52 fits into a cooperating hemispheric cavity 54 in the S-type cam 30. As the S-type cam 30 rotates clockwise about its pivot, the hemispheric cavity 54 applies compressive force to collar 50. This compressive force is exerted through the push rod 52 in the direction indicated by 56. A hemispheric collar 58 engaged in cooperating hemispheric cavity 60 in the S-type cam 30 applies equal and opposite tension force in the direction shown by 62 to a pull rod 64. Permanently lubricated inserts 51 and 59 may be located between the bearing surfaces of collar 50 and cavity 54 and between collar 58 and cavity 60 respectively.

Returning to FIG. 2, the push and pull forces along rods 52 and 64 are connected to cam levers 34 and 32 using hemispheric collars 70 and 72 and cooperating hemispheric cavities 74 and 76, all respectively. Permanently lubricated inserts 75 and 77 may be located between the bearing surfaces of collar 70 and cavity 74 and between collar 72 and cavity 76, respectively.

Figure 5:
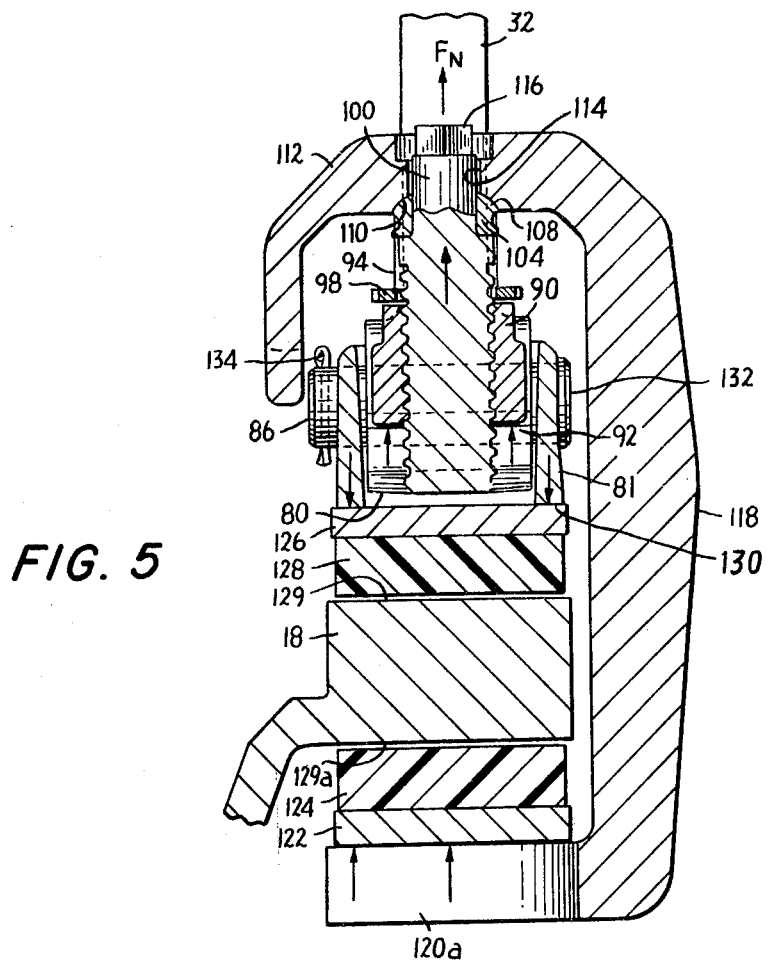
FIG. 5 shows a cross-sectional view taken along 5—5 in FIG. 2.

Referring to FIGS. 4 and 5, the two cam levers 34, 32 are connected to pivoted cams 78 and 80. The pivoted cams 78, 80 are pivotably engaged with cam carrier 81 by two permanently lubricated pivots 84 and 86. A lip 88 on pivoted cam 78 engages the underside of adjusting nut 90. A similar lip 92 on pivoted cam 80 also engages the underside of adjusting nut 90.

Adjusting nut 90 threadably receives an adjusting screw 94 in a threaded hole 96. A star wheel 98 is positioned in keyed relationship with the adjusting screw 94. A reduced-diameter shaft 100 on the adjusting screw 94 fits the axial bore 102 in an adjusting screw guide 104. A shoulder 106 is formed at the point that the reduced diameter shaft joins the upper end of the adjusting screw 94.

The upper surface 108 of the adjusting screw guide 104 is dome shaped to engage a similarly shaped socket 110 in the caliper 112. A circular hole 114 in the center of the socket 110 allows the protrusion of the end of the reduced diameter shaft 100 outside the caliper 112. Flats 116 on the end of the reduced diameter shaft 100 enable attachment of a wrench thereto for manual adjustment of the brake.

A transverse member 118 transmits force applied to the caliper 112 at the socket 110 to two reaction legs 120, 120a on the opposite side of the brake disc 18. The two reaction legs 120, 120a are positioned adjacent to an outboard shoe plate 122. The outboard shoe plate 122 is connected to an outboard brake lining 124 by methods well known in the art such as riveting, adhesive bonding or integral molding.

An inboard shoe plate 126 and an inboard brake lining 128 are located adjacent to the inboard parallel surface 129 of the brake disc 18. The cam carrier 81 has its bearing surface 130 in contact with the inboard shoe plate 126.

When application of the brake forces the ends of cam levers 34 and 32 to move outward in the directions 56 and 62, the cams 78 and 80 rotate about their pivots 84 and 86 in the direction shown by the curved arrows. The cam lips 88 and 92 bear upward against the underside of the adjusting nut 90. A downward force is thereby transmitted through the pivots 84 and 86 and the cam carrier 81 to the inboard shoe plate 126; and an equal upward force is simultaneously transmitted through the adjusting screw 94 and adjusting screw guide 104 to the caliper 112. The upward force is transmitted through the transverse member 118 and the two reaction legs 120, 120a to the outboard shoe plate 122. Equal and opposite normal forces are thereby transmitted to the outboard and inboard brake linings 124 and 128 which are thus brought into frictional contact with the outboard and inboard parallel surfaces 129a and 129 of the brake disc 18.

Also in FIG. 5, pivot 86 is a pin having a head 132 at one end and a cotter pin 134, or other means to prevent accidental removal, at the other end. The caliper 112, with its transverse member 118 and reaction leg 120a is seen to partially encircle the brake disc 18 and the force-developing elements previously described.

The entire assembly shown in FIGS. 4 and 5 is free to translate normal to the parallel surfaces of the brake disc 18 in order to apply equal forces to the two parallel surfaces 129, 129a.

Figure 6:
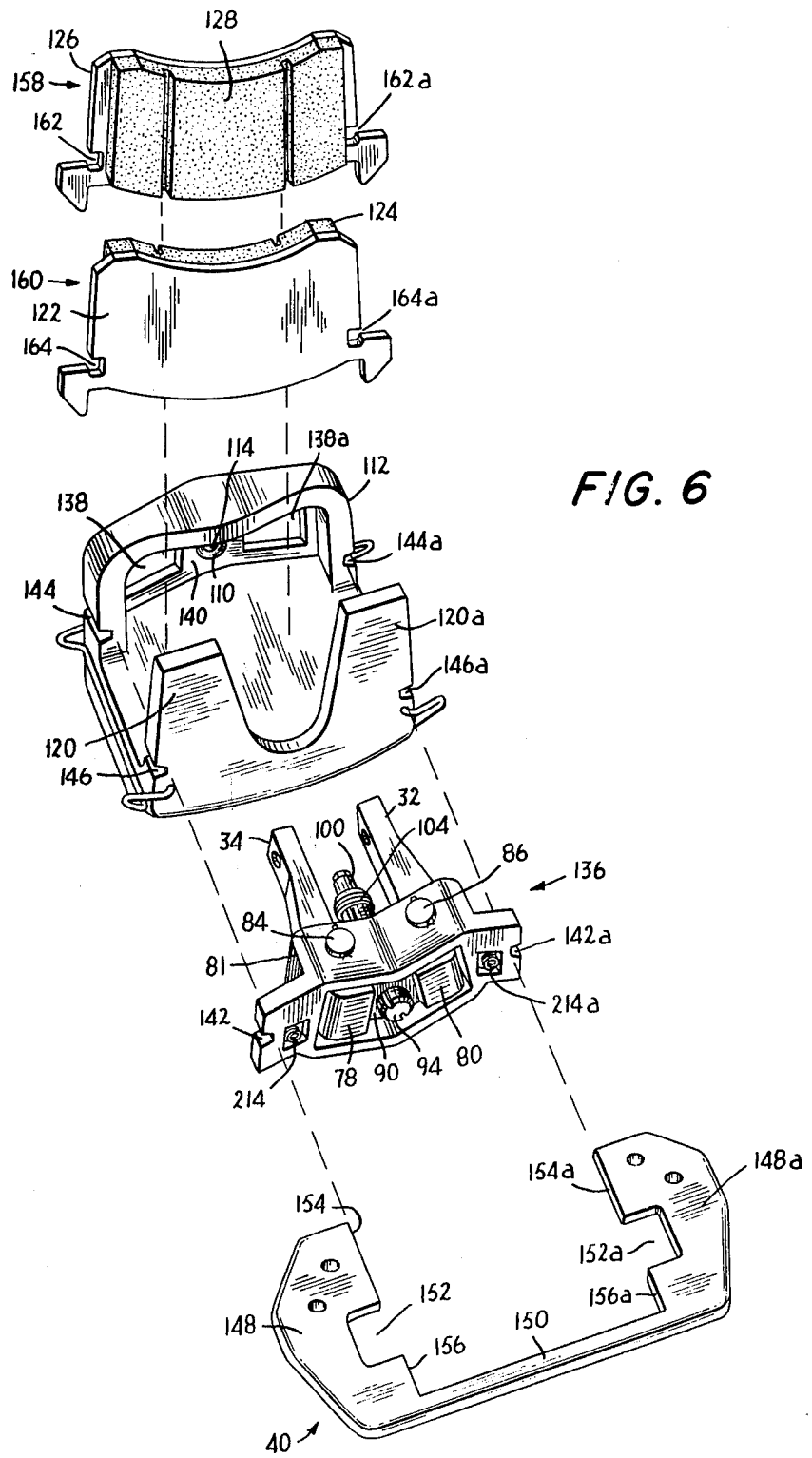
FIG. 6 shows an exploded view of a portion of the air actuated disc brake.

FIG. 6 shows an exploded view which will be used to describe how the cam and carrier assembly 136 is fitted into the caliper 112 and the whole is locked together by the support plate 40.

The caliper 112 contains two rectangular holes 138, 138a and the circular hole 114 and socket 110 is its closed end 140. Holes 138, 138a are larger than the cross section of the cam levers 34 and 32. The cam and carrier assembly 136 is fitted inside the closed end 140 of the caliper 112 by lifting and tilting the cam carrier assembly 136 so that the ends of the cam levers 34 and 32 fit through the holes 138, 138a. As the cam and carrier assembly 136 is nested inside the closed end 140, the end of the reduced diameter shaft 100 protrudes through the circular hole 114 and the adjusting screw guide 104 comes to rest within the cooperating socket 110.

In the nested position of the cam and carrier assembly 136 a first pair of grooves 142, 142a in the sides of the cam carrier 81 are aligned adjacent to a second pair of grooves 144, 144a in the sides of the closed end 140 of the caliper 112. A third pair of grooves 146, 146a in the outside surfaces of the reaction legs 120, 120a are aligned with the first and second pair of grooves 142, 142a and 144, 144a respectively.

The support plate 40 is in a general U shape having two opposed end portions 148, 148a connected by a frame portion 150. The insides of the arms of the U are generally parallel and each is interrupted by a rectangular opening 152, 152a to form a forward pair of parallel surfaces 154, 154a and a rear pair of parallel surfaces 156, 156a. The forward surfaces 154, 154a are so spaced and the material thickness is such that a sliding fit of the forward surfaces 154, 154a into the grooves 144, 142 and 144a, 142a is possible. Similarly, the rear surfaces 156, 156a are capable of a sliding fit within the grooves 146, 146a. When so assembled, the tongue-in groove connection holds the cam and carrier assembly 136 correctly aligned within the caliper 112 but allows lateral sliding movement of the assembled parts on surfaces 154, 154a and 156, 156a.

The inboard and outboard brake shoes 158, 160 are inserted through the opening provided by the openings 152, 152a. The inboard brake shoe 158 is moved toward the closed end 140 of the caliper 112 until the grooves 162 and 162a in the inboard shoe plate 126 engage the forward surfaces 154, 154a. The inboard brake shoe 158 is moved along forward surfaces 154, 154a until it comes to rest against the cam and carrier assembly 136. Similarly, two grooves 164, 164a on the outboard brake shoe plate 122 are fitted on the rear pair of parallel surfaces 156, 156a and moved outward until the outboard shoe plate 122 bears against the reaction legs 120, 120a. In the positions just described, the inboard brake lining 128 faces the outboard brake lining 124 across a gap. The gap is wide enough to accommodate the brake disc 18 (see also FIGS. 4 and 5) when finally assembled and installed as will be described. The S-type cam 30 is preassembled to the ends of the pull rod 64 and push rod 52 which interconnect the caliper assembly 35 with the S-type cam 30 which may be preassembled to form cam and caliper assembly 136, FIG. 7, a major subassembly to be mounted on the vehicle.

Figure 7:
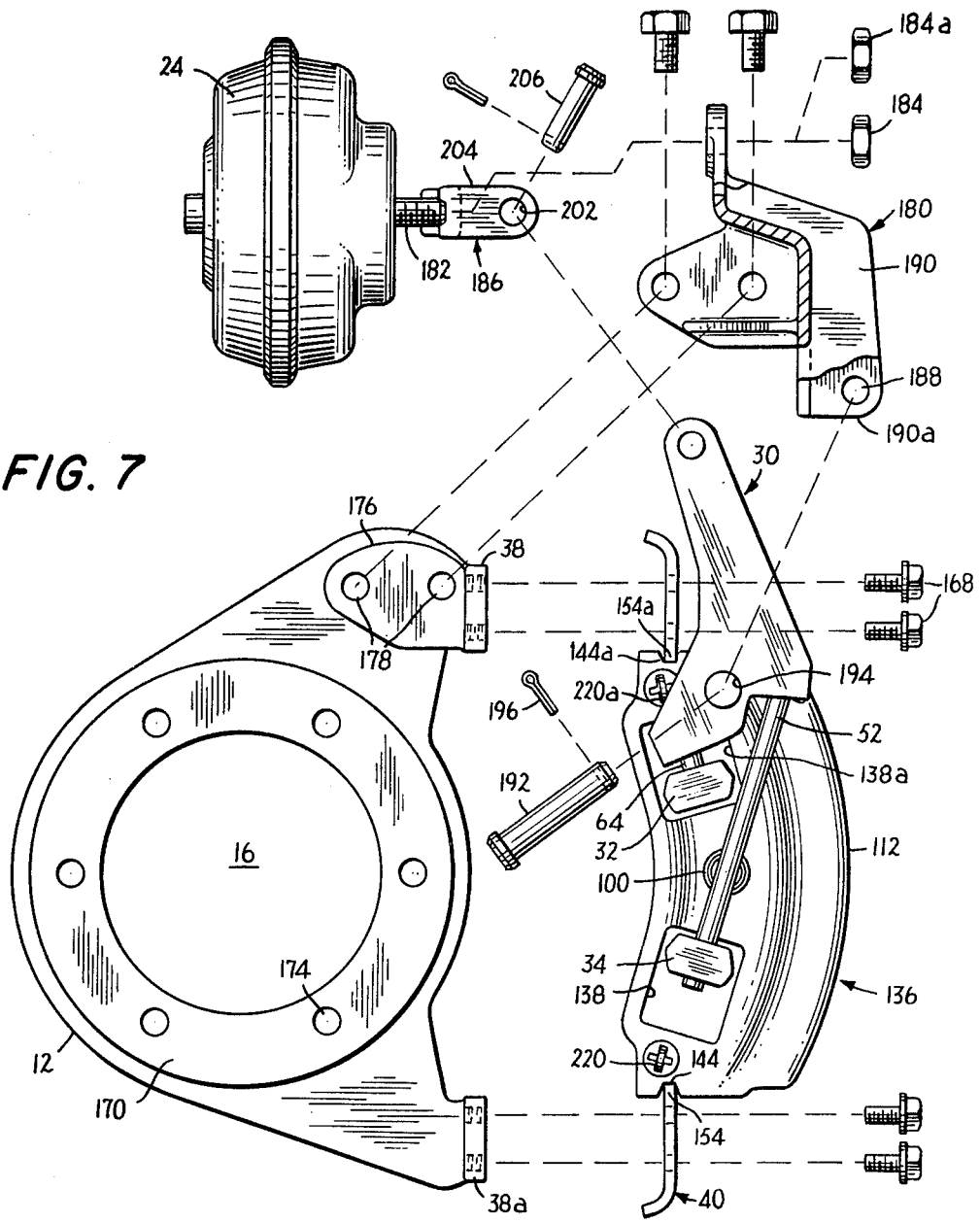
FIG. 7 shows an exploded view of the disc brake illustrating the assembly of major subassemblies.

Referring further to FIG. 7, the preassembled caliper and support plate 40 with attached S-type cam is mounted upon anchor flanges 38, 38a using for example a plurality of bolts 168. The cam and caliper assembly 136 and its contained parts remain free to translate along the pairs of parallel surfaces 154, 154a and 156, 156a on the support plate 40 as previously described.

The torque plate 12 contains a circular flange 170 which has a circular opening 16 and a plurality of holes 174 in its perimeter. Flange 170 is adapted for attachment to the axle flange (not shown) of a motor vehicle using for example a plurality of bolts through the plurality of holes 174. The circular opening 16 accommodates the passage therethrough of the shaft and wheel hub (not shown). The torque plate 12, brake-support plate 40 and caliper 112 in combination, hold the brake shoes or friction members 158, 160, adjacent to the brake disc 18 as previously discussed.

Figure 8:
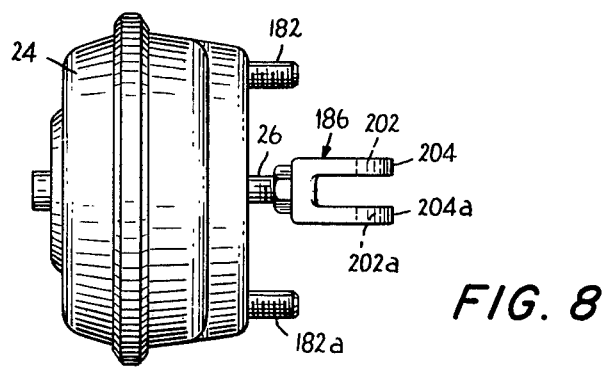
FIG. 8 shows a view of the air chamber in FIG. 7 rotated 90 degrees about its axis.

A mounting flange 176 containing bolt holes 178 provides a mounting location for an air-brake chamber bracket 180. The air-brake chamber 24 is mounted to the air-brake chamber bracket 180 using a pair of threaded studs 182, 182a and cooperating nuts 184, 184a. In the isolated view of the air-brake chamber 24 shown in FIG. 8, the threaded studs 182, 182a are symmetrically located on either side of the chamber push rod 26. A clevis 186 is attached to the end of the chamber push rod 26.

Figure 9:
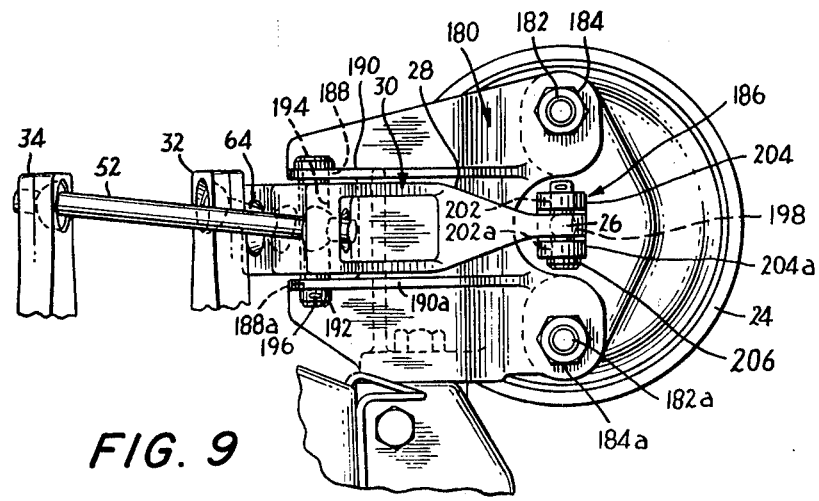
FIG. 9 shows a top view of a portion of the assembled brake taken along 9—9 in FIG. 2.

Referring now to FIG. 9, the air-brake chamber bracket 180 has bearing holes 188, 188a passing through two side plates 190 and 190a. The S-type cam 30 is pivotally secured between the side plates 190, 190a by a pin 192 which passes through the bearing hole 188 in the first side plate 190, the pivot hole 194 and through the bearing hole 188a in the second side plate 190a. The pin 192 is secured in place by, for example, a cotter pin 196.

The pivot hole 198 at the end of the lever arm 28 of the S-type cam 30 is aligned in position with bearing holes 202, 202a through the two arms 204, 204a of the clevis 186. A bearing pin 206, inserted through the bearing holes 202, 202a and the pivot hole 198, connect the S-type cam 30 to the clevis 186. The S-type cam 30 is connected by pull rod 64 and push rod 52 to the cam levers 32 and 34 as previously described.

Referring to FIGS. 2 and 9, it can be seen that the mass of the air-brake chamber 24 is not rigidly attached to the slideably mounted caliper assembly 35. Instead, the air-brake chamber is rigidly mounted to the torque plate 12. The caliper assembly 35 is free to slide along the brake-support plate 40 (in and out of the page in FIG. 1) by hinge-like rotation of the hemispheric joints at the ends of the push rod 52 and pull rod 64. Thus the masses of the air-brake chamber 24 and its bracket 180 are not added to the vibration mass of the sliding caliper assembly 35.

Refer to FIG. 4 for the following description. In order to reduce friction between the brake shoes 158 and 160 and the brake disc 18 in the brakes-off condition, two return springs 208, 208a, or anti-scuff springs, are connected between the cam carrier 81 and the caliper 112. Each end of the cam carrier 81 has a hole 210, 210a having an enlarged lower diameter 212, 212a forming a stepped bore. The bottom ends 214, 214a of the springs 208, 208a are enlarged to a diameter greater than the holes 210, 210a but smaller than the enlarged diameters 212, 212a forming a stepped diameter. The bottom end 214, 214a of the springs 208, 208a are consequently retained in the cam carrier 81. At their upper ends, the springs 208, 208a pass into aligned holes 216, 216a or bores in the caliper 112 and are connected to the lower lobes 218, 218a of spring retainers 220, 220a. The spring retainers 220, 220a are captured by slotted washers 222, 222a which bear against mating surfaces on the caliper 112.

Figure 10:
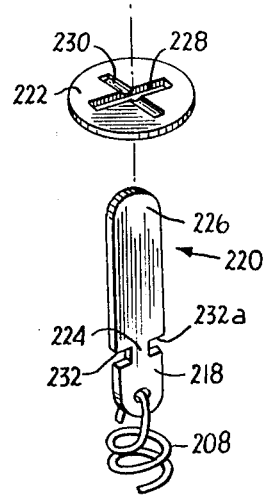
FIG. 10 shows a close-up view of the spring retainer and slotted washer.

An isolated view of a spring retainer 220 and its associated slotted washer 222 is shown in FIG. 10. The spring retainer 220 has a narrow waist region 224 between the lower lobe 218 and an upper lobe 226. The slotted washer 222 contains a slot 228 whose long dimension exceeds the width of the upper lobe 226 and whose shorter dimension is wider than the waist region 224. A linear depression 230 is located in the slotted washer 222 at right angles to the slot 228. The spring retainer 220 is engaged in the slotted washer 222 by passing the upper lobe 226 through the slot 228 until the waist region 224 is level with the slotted washer 222. The spring retainer 220 is then turned 90° and released. The shoulders 232, 232a above the waist region 224 are engaged in the linear depression 230 and are retained thereby the continuing downward force applied by the stretched return spring 208.

Returning to FIG. 4, when the brakes are released, the return springs 208, 208a pull the cam carrier 81 positively away from the inboard brake shoe 158 to the limit of the brake adjustment tolerance. With all cam pressure positively removed, the brake shoes 160 and 158 are free to be moved away from the brake disc 18 by any axial runout of the brake disc 18. Thus, the fuel economy attainable with drag-free brakes is obtained.

Figure 11:
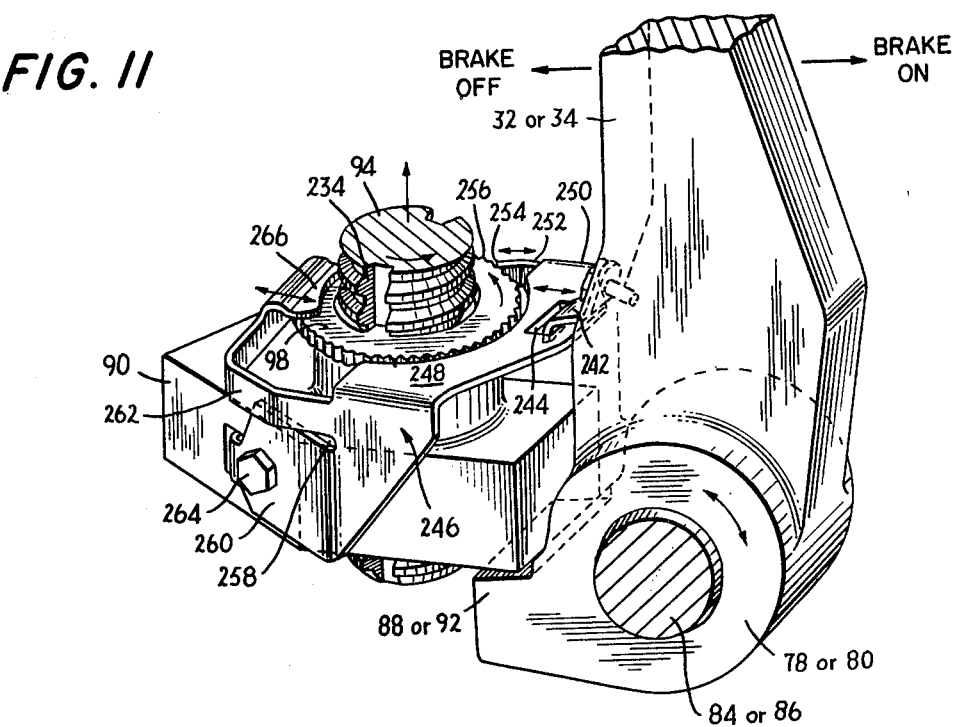
FIG. 11 shows a perspective view of the adjusting mechanism.
Figure 12:
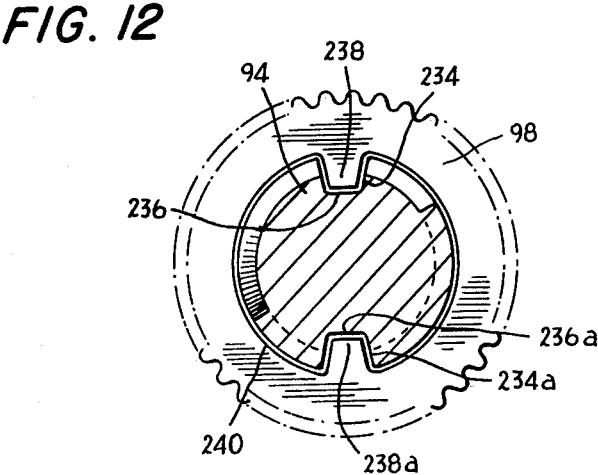
FIG. 12 shows a cross-sectional view of the star wheel and adjusting screw showing the method of keying these parts together.

The automatic adjuster mechanism is shown in FIG. 11. The star wheel 98 and adjusting screw 94 are fixed together such that rotary motion of the star wheel 98 is imparted to the adjusting screw 94. One method of fixing the two together which has been reduced to practice is shown in FIG. 12. The adjusting screw 94 contains two vertical slots 234, 234a at locations 180° diametrically opposed. The slots 234, 234a are of regular trapezoidal cross section in which the shorter base of the trapezoids 236, 236a are nearer the axis of rotation of the adjusting screw 94. The star wheel 98 has similarly shaped trapezoidal inward projections 238, 238a which fit loosely into the slots 234, 234a. In addition, the hole 240 in the star wheel 98 fits loosely over the outer diameter of the threads of the adjusting screw 94. Thus, if not restrained, the star wheel 98 could be freely slid along the length of the adjusting screw 94.

Returning to FIG. 11, a tang 242 attached to the inner surface of one of the cam levers 32 or 34 engages a slot 244 in an adjuster spring 246. The adjuster spring 246 consists of a horizontal part 248 containing the aforementioned slot 244 and two vertical portions. One vertical portion, connected to the horizontal part 248 by a right-angle band at 250 forms a finger 252. The end 254 of the finger 252 is spring loaded to engage the teeth 256 of the star wheel 98. Because the finger 252 approaches the star wheel 98 at close to a tangential angle, the finger 252 acts like a ratchet, imparting counter-clockwise motion of the star wheel 98, as indicated by an arrow inscribed thereon.

The other vertical portion of the adjuster spring 246 is divided by a horizontal slot 258 into an attachment tab 260 and a control arm 262. The attachment tab 260 is firmly affixed near its outer end to the adjusting nut 90 using, for example a bolt 264. The outer end of the control arm 262, normally rests adjacent to the teeth of the star wheel 98 and a retainer tab 266 loosely overlaps the upper surface of the star wheel 98. The retainer tab 266 restrains the star wheel 98 from sliding up the adjusting screw 94, and keeps the star wheel 98 loosely adjacent to the upper surface of the adjusting nut 90.

It will be evident that, each time the brake is applied, the cam 78 or 80 rotates clockwise about its pivot 84 or 86. The tang 242 is drawn toward the right by the motion of the cam lever 32 or 34. The rightward motion of the tang 242 causes the attachment tab 260 to bend, thus allowing the finger 250 to move toward the right. As the attachment tab 260 bends, the control arm 262 is urged against the teeth of the star wheel 98. This pressure against the teeth of the star wheel 98 prevents the star wheel 98 from rotating as the finger 252 is drawn to the right. Most of the time, full brake actuation fails to move the finger 252 far enough rightward for the end 254 of the finger 252 to drop into and engage the next adjacent tooth 256. However, after the brake linings have become slightly worn, the cam lever 32 or 34 and the attached tang 242 and adjuster spring 246 are drawn far enough to the right to allow the end 254 of the finger 252 to drop into and engage the next adjacent tooth on the star wheel 98. When the brake is released, the resulting leftward motion of the finger 252 forces the star wheel 98 to rotate one tooth pitch. The adjusting screw 94 is thus advanced a small increment to compensate for brake wear. The consequent tightening of the brake adjustment reduces the travel of the cam lever 32 or 34 to less than the amount required to enable further adjustment. This situation continues until additional wear allows the finger 252 to again engage the next adjacent tooth 256 and add another increment of adjustment to the brake. The adjustment is thus seen to be automatically controlled by the actual amount of wear.

Note that the teeth 256 on the star wheel 98 have rounded tips. This allows the automatic adjustment to be overridden by manual adjustment using a wrench on the flats 116 (shown at FIG. 5) at the end of the adjusting screw 94. When the adjusting screw 94 is manually rotated, the flexible finger 252 is forced to ride over the tooth 256, and drop into engagement with the next tooth 256. This applies for both directions of rotation of the adjusting screw 94.

Figure 13:
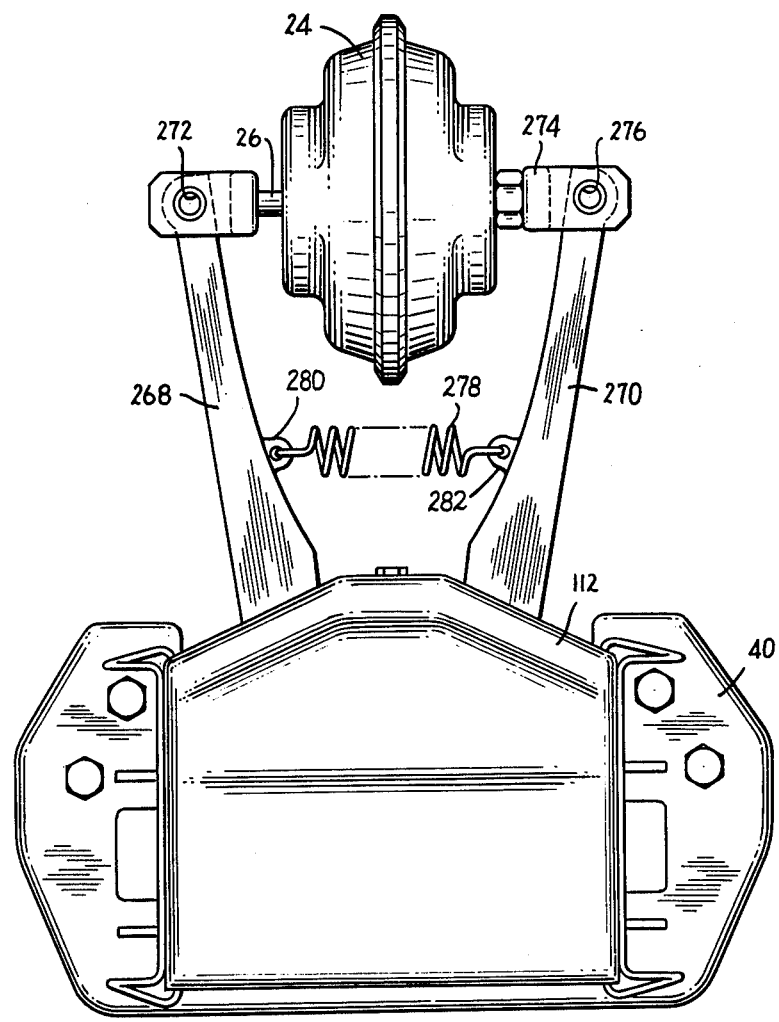
FIG. 13 shows an alternate embodiment of the disc brake.

An alternate embodiment of the disc brake is shown in FIG. 13 in which internal and attachment details are identical to the embodiment previously described. Two cam levers 268 and 270 protrude from the caliper 112. An airbrake chamber 24 is located between the two cam levers 268 and 270. The chamber push rod 26 is pivotally connected to a hole 272 near the end of one cam lever 268. A mounting lug 274 on the opposite side of the air-brake chamber 24 is pivotally connected to a hole 276 near the end of cam lever 270. A return spring 278 is connected to tabs 280 and 282 on the cam levers 268 and 270 respectively.

When the air brakes are applied, the chamber push-rod 26 is forced outward from the air-brake chamber 24. The ends of cam levers 268 and 270 are forced apart. Braking forces are developed within the disc brake entirely analogously to the operation previously described. When the air brakes are released, the return spring 278 pulls the cam levers 268 and 270 toward each other to aid in the rapid and complete disengagement of the brake. The together-directed force on the cam levers 268 and 270 forces the chamber push rod into the air brake chamber 24.

Figure 14:
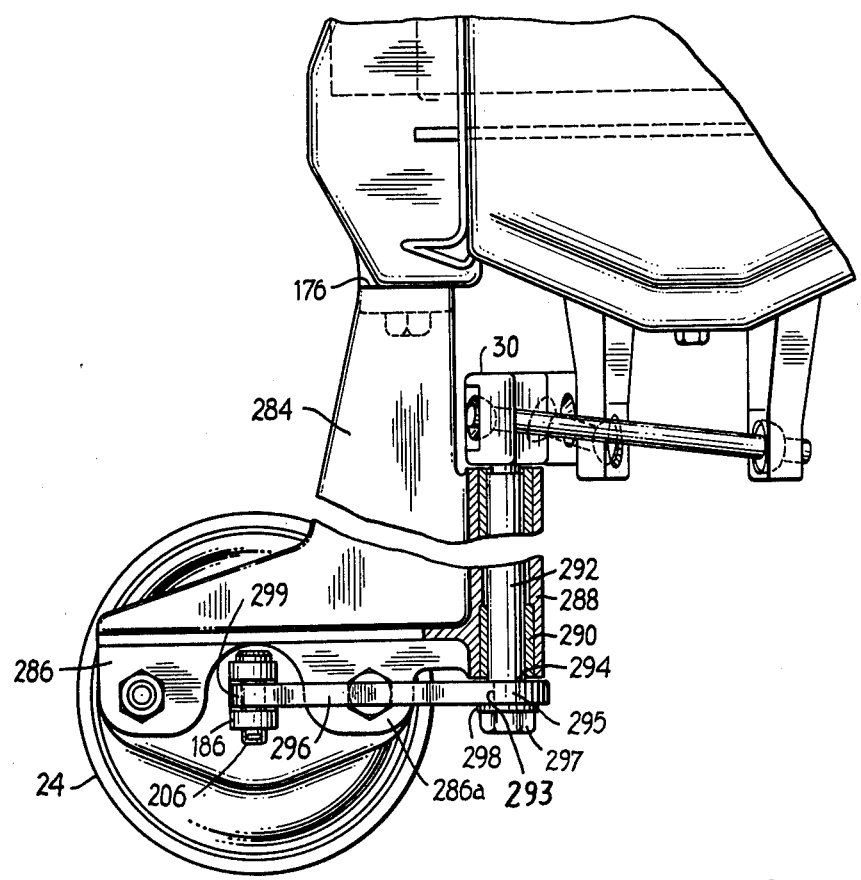
FIG. 14 shows an embodiment in which the air brake chamber is supported at the end of a cantilever.

FIG. 14 shows an embodiment in which the air brake chamber 24 is supported at the end of a cantilever 284. The use of the cantilever 284 is an adaptation made necessary by the interference of suspension springs and other vehicle parts with an air-brake chamber 24 which is closely connected as in those previously described. The cantilever 284 is bolted to the mounting flange 174 on the torque plate 12. The air brake chamber 24 is bolted to support flange 286, 286a at the unsupported end of the cantilever 284.

A cylindrical tube 288, integratedly formed with the cantilever 284 contains a bushing 290 which is preferably of the kind containing lubricant. The cylindrical shaft 292, attached to the S-type cam 30 is slidably fitted into the bushing 290. The shaft 292 is stepped down to a smaller diameter 293 near its end, thereby forming a shoulder 294. A hole 295 in a cam actuating lever 296 is fitted over the smaller diameter 293 and the actuating lever 296 bears against the shoulder 294. A nut 297 and lockwasher 298 rigidly connect the actuating lever 296 to the shaft 292. The other end of the actuating lever 296 is hingeably connected to the clevis 186 of the air-brake chamber using the bearing pin 206 through the clevis 186 and a cooperating hole 299 in the actuating lever 296. The jagged lines across the cantilever 284 and associated members indicates that the cantilever 284 can be of any convenient length which is required to displace the air-brake chamber 24 to a non-interferring location.

It will be understood that the claims are intended to cover all changes and modifications of the preferred embodiments of the invention, herein chosen for the purpose of illustration which do not constitute departures from the spirit and scope of the invention. For example, although a disc brake with two brake shoes forced against opposing sides of the brake disc is shown and described, a fixed caliper 112 containing a single brake shoe 158 operated by the levers and cams of any of the described embodiments could be substituted without departing from the spirit and scope of the invention.

I claim:

1. In a vehicular disc brake system having at least one friction member retained in a brake caliper and actuated by applying mechanical motion thereto and wherein brake wear results from braking friction, the improvement of an automatic disc brake adjuster mechanism comprising:
    (a) an adjuster nut containing a threaded hole;
    (b) a threaded adjusting screw engaged in said threaded hole;
    (c) a star wheel on said threaded screw;
    (d) means for relatively non-rotating connecting of said star wheel to said threaded adjusting screw;
    (e) a spring finger resiliently connected to said adjuster nut in ratchetable contact with said star wheel;
    (f) means for connecting the mechanical motion applied to said friction member to said spring finger;
    (g) means for compensating for said wear when said star wheel and attached adjusting screw are rotated by said spring finger; and
    (h) retainer means attached to said adjuster nut for retaining said star wheel adjacent said adjuster nut.

2. The improvement recited in claim 1 further comprising manual means for rotating said adjusting screw whereby said automatic adjuster mechanism is overridden.

3. The improvement recited in claim 1 wherein said means for compensating for wear comprises:
    (a) means for applying force from said adjusting screw to said caliper; and
    (b) means for applying force from said adjuster nut to said at least one friction member.

4. In a vehicle having axles and disc service brakes of the type having two friction members adapted to frictional contact with the two radial faces of a brake disc, the improvement comprising:
    (a) means for holding said two friction members adjacent to the radial surfaces of said brake disc;
    (b) at least one lever;
    (c) means for applying force to said at least one lever;
    (d) cam means attached to said at least one lever for exerting force by mechanical motion in response to said applied force between said means for holding and a first of said two friction members, said exerted force being in the direction to urge said first of said two friction members into braking frictional contact with a first radial surface of said brake disc;
    (e) means for restraining said cam means against rotation about an axis parallel to the axis of the disc during actuation thereof;
    (f) said means for applying force acting on said lever with a line of action substantially parallel to the face of said brake disc;
    (g) means on said means for holding for transmitting force to a second of said friction members, said transmitted force being in the direction to urge said second of said two friction members into braking frictional contact with a second radial surface of said brake disc;
    (h) automatic adjusting means operative to compensate for brake shoe wear, said automatic adjusting means comprising:
        (i) an adjuster nut containing a threaded hole;
        (ii) a threaded adjusting screw engaged in said threaded hole;
        (iii) a star wheel about said threaded screw;
        (iv) means for maintaining said star wheel non rotating with respect to said threaded adjusting screw;
        (v) an adjuster spring attached to said adjuster nut;
        (vi) a spring finger on said adjuster spring in ratchetable contact with said star wheel;
        (vii) means for connecting the mechanical motion applied to said brake shoes to said spring finger whereby said star wheel and attached adjusting screw are rotated by said spring finger in proportion to wear on said friction members;
        (viii) means for compensating for said wear when said adjusting screw is rotated;
        (ix) an arm on said adjuster spring movable into frictional contact with said star wheel during operation of the brakes.

5. In a vehicle having at least one brake using at least one friction member and a rotating frictional surface of a type having mechanical motion applied to said friction member to urge said friction member into frictional contact with said rotating frictional surface, and wherein frictional forces cause wear on the frictionally contacting parts, the improvement of an automatic brake adjuster comprising:
    (a) a threaded adjusting nut;
    (b) a threaded adjusting screw threadably engaged in said adjusting nut;
    (c) at least one longitudinal slot in the surface of said adjusting screw;
    (d) a star wheel having an axial hole therein adapted to slidably fit over the threads on said adjusting screw;
    (e) at least one inward projection on said star wheel into said axial hole, said inward projection fitting into said longitudinal slot whereby relative rotation of said adjusting screw and star wheel is prevented;
    (f) an adjuster spring attached to said adjusting nut;
    (g) retainer means on said adjuster spring for restraining said star wheel and keeping it adjacent to said adjusting nut;
    (h) a finger on said adjuster spring biased into angled contact with the perimeter of said star wheel; and
    (i) means for connecting said mechanical motion to said adjuster spring whereby said finger is urged into sliding motion against the perimeter of said star wheel.

6. The apparatus recited in claim 5 further comprising:
    (a) rounded teeth on said star wheel; and (b) means for manually rotating said adjusting screw and star wheel whereby the automatic brake adjuster is overridden, the rounded teeth allowing said finger to slide up and over the teeth during manual rotation.

7. The improvement recited in claim 5 further comprising:

(a) a control arm on said adjuster spring;
(b) an outer end on said control arm disposed touchingly adjacent to the teeth of said star wheel; and
(c) said means for connecting being operative to press said outer end into frictional bearing relationship with the teeth of said star wheel when the brakes are applied.

* * * * *